(12) United States Patent
Chen et al.

(10) Patent No.: US 6,965,423 B2
(45) Date of Patent: Nov. 15, 2005

(54) LIQUID CRYSTAL DISPLAY AND FABRICATING METHOD THEREOF

(75) Inventors: Jun Chang Chen, Taichung (TW); Ya-Hsiang Tai, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 58 days.

(21) Appl. No.: 10/436,795

(22) Filed: May 13, 2003

(65) Prior Publication Data

US 2004/0227892 A1      Nov. 18, 2004

(51) Int. Cl.[7] ........................................ G02F 1/1343
(52) U.S. Cl. ..................... 349/143; 349/139; 349/106
(58) Field of Search ......................... 349/143, 43, 106, 349/42, 139

(56) References Cited

U.S. PATENT DOCUMENTS 6,549,258 B1 * 4/2003 Shin et al. ................. 349/141
6,628,357 B1 * 9/2003 Maeda et al. .............. 349/113
6,665,037 B2 * 12/2003 Hagiwara ................... 349/148

* cited by examiner

Primary Examiner—Toan Ton
(74) Attorney, Agent, or Firm—Quintero Law Office

(57) ABSTRACT

A liquid crystal display (LCD) and fabricating method thereof. The LCD includes a first substrate, provided with a plurality of parallel gate lines and a plurality of parallel signal lines, wherein the gate lines and signal lines are perpendicular, and a pixel area is defined by two adjacent gate lines and two adjacent signal lines. A source electrode, electrically connected to one of the adjacent signal lines, and a drain electrode are formed on the pixel area. A first pixel electrode is formed, electrically connected to the drain electrode, on the pixel area. A second substrate is provided a predetermined distance above the first substrate, having a plurality of color-filtering areas, directly above the respective pixel area. A second pixel electrode layer is formed on the second substrate, wherein the part thereof directly above the signal lines is relatively thin.

15 Claims, 13 Drawing Sheets

LIQUID CRYSTAL DISPLAY AND FABRICATING METHOD THEREOF

BACKGROUND OF THE INVENTION

1. Field of the Invention

The present invention relates to a liquid crystal display, and more particularly to a liquid crystal display with reduced crosstalk.

2. Description of the Related Art

Liquid crystal display (LCD) is a commonly used flat panel display. Owing to dielectric anisotropy and conductive anisotropy of liquid crystal molecules, molecular orientation of liquid crystals can be shifted under an external electronic field, such that various optical effects are produced.

A LCD panel is generally made up of two substrates, with a certain gap preserved therebetween, and a liquid crystal layer filled within the gap. Respective electrodes are formed on the two substrates, respectively, to control the orientation and oriental shift of liquid crystal molecules.

A TFT (thin film transistor) LCD panel is generally made up of a TFT array substrate and a color filter substrate. The detailed structures are described as follows.

FIG. 1 is a top view showing a conventional TFT array substrate. FIG. 2 is a cross-section taken at the line I—I in FIG. 1. In the manufacture of TFT array substrate, an insulating substrate 101, made of, for example, glass or quartz, is provided. A gate electrode 108 and an insulating layer 107 (not shown in FIG. 1) are then formed sequentially on the insulating substrate 101. Then, a channel layer 106 is formed on the insulating layer 107, and a source electrode 102 and drain electrode 103 are formed on the channel layer 106, respectively. Afterward, signal lines 104 and pixel electrodes 105 are formed on the insulating layer 107, electrically coupling to the source electrode 102 and drain electrode 103, respectively.

FIG. 3 is a cross-section taken at the line II—II in FIG. 1, showing the cross-section of the signal line 104.

FIG. 4 illustrates the structure of the color filter substrate. The color filter substrate includes a glass substrate 201, a black matrix (BM) 202 for anti-reflection, color-filtering units of red 203, green 204, and blue 205, and a sputtered pixel electrode layer 206 as a corresponding electrode to the pixel electrode 105 of TFT array substrate. The shapes, sizes, colors, and arrangements of the color-filtering units are adjustable according to requirements. The pixel electrode layer 206 is a transparent conductive layer of, for example, indium tin oxide layer.

After the separate manufacture of the TFT array substrate and color filter substrate, the two substrates are then aligned and joined with a gap therebetween, and liquid crystal is filled into the gap to form the liquid crystal layer 3, thereby completeing the TFT panel fabrication.

FIG. 5 is a cross-section of the TFT panel taken at the line II—II in FIG. 1.

Due to the full coverage of pixel electrode layer 206 on the upper substrate 201, the pixel electrode 206 is formed against the signal lines 104 at the same time. The pixel electrode layer 206 and signal lines 104 are made of metal. Two layers of metal with dielectric material, i.e. the liquid crystal layer 3, inserted therebetween, result in capacitor effect, which weakens the signals, produces crosstalk, deteriorating display quality and affecting yield. Moreover, crosstalk becomes more serious in larger display panels.

SUMMARY OF THE INVENTION

Accordingly, an object of the present invention is to reduce crosstalk, thereby ameliorating display quality problems.

Therefore, in the invention, the pixel electrode layer on the color filter substrate is thinned or removed above the signal lines on the TFT array substrate to reduce coupling capacitance between the pixel electrode on the color filter substrate and the signal lines on the TFT array substrate, reducing crosstalk, improving display quality, and increasing performance and yield.

The invention provides a liquid crystal display, which comprises a first substrate, provided with a plurality of parallel gate lines and a plurality of parallel signal lines formed thereon, wherein the gate lines and signal lines are perpendicular, and a pixel area is defined by two adjacent gate lines and two adjacent signal lines. A source electrode and a drain electrode are formed on the pixel area, wherein the source electrode is electrically connected to one of the two adjacent signal lines, and a first pixel electrode is formed on the pixel area, electrically connected to the drain electrode. A second substrate is provided a predetermined distance above the first substrate, having a plurality of color-filtering areas, each formed directly above the respective pixel area on the first substrate. A second pixel electrode layer is formed on the second substrate, wherein the part of the second pixel electrode layer directly above the signal lines is relatively thin.

The invention further provides a liquid crystal display, which comprises a first substrate, provided with a plurality of parallel gate lines and a plurality of parallel signal lines formed thereon, wherein the gate lines and signal lines are perpendicular, and a pixel area is defined by two adjacent gate lines and two adjacent signal lines. A source electrode and a drain electrode are formed on the pixel area, wherein the source electrode is electrically connected to one of the two adjacent signal lines, and a first pixel electrode is formed on the pixel area, electrically connected to the drain electrode. A second substrate is provided a predetermined distance above the first substrate, having a plurality of color-filtering areas, each formed directly above the respective pixel area on the first substrate. A second pixel electrode layer is formed on the second substrate, wherein the part of the second pixel electrode layer directly above the signal lines is hollow.

A method of fabricating a liquid crystal display is further provided, which comprises providing a first substrate, having a plurality of parallel gate lines and a plurality of parallel signal lines formed thereon, wherein the gate lines and signal lines are perpendicular, a pixel area is defined by two adjacent gate lines and two adjacent signal lines, and a source electrode, electrically connected to one of the two adjacent signal lines, and a drain electrode are formed on the pixel area, forming a first pixel electrode, electrically connected to the drain electrode, on the pixel area, providing a second substrate, having a plurality of color-filtering areas and a second pixel electrode layer formed thereon, a predetermined distance above the first substrate, wherein a part of the second pixel electrode layer is relatively thin, aligning the first and second substrates such that each color-filtering area on the second substrate corresponds to one pixel area located below on the first substrate, and the part of the second pixel electrode layer corresponds to the signal lines located below on the first substrate, and finally combining the first and the second substrates.

According to the invention, the first and the second pixel electrode are not limited to certain material, and are preferably made of indium tin oxide (ITO) or indium zinc oxide (IZO).

The relatively thin part of the second pixel electrode layer is formed by, for example, photolithography to thin or remove the corresponding part of the pixel electrode layer, such that a thinned part, thinner than the pixel electrode layer, or a hollow part, is formed. The thickness of the thinned part is not limited. As long as the part is thinned, i.e. thinner than the other part of the pixel electrode layer, the coupling capacitance between the pixel electrode layer and the signal lines can be reduced, such that the object of the invention can be fulfilled. Accordingly, thickness of the thinned part is preferably zero, such that the pixel electrode in the area is preferably completely removed to be hollow.

According to the invention, the thinned or hollow part of the pixel electrode layer is preferably segmented by the area, corresponding to a part of the signal lines, where the source electrode adjoins, into a plurality of striped areas.

According to the inventive liquid crystal display and fabricating method thereof, capacitance loading of the signal lines is reduced by thinning of the corresponding pixel electrode, such that crosstalk resulting from coupling capacitance is reduced, and display quality is improved.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Manufacture of TFT Array Substrate

FIGS. 6A–6D show the manufacturing process of TFT array substrate of the invention. Bottom-gate type-TFT is used here to explain the manufacturing process, while top-gate type TFT is also applicable.

Figure 1:
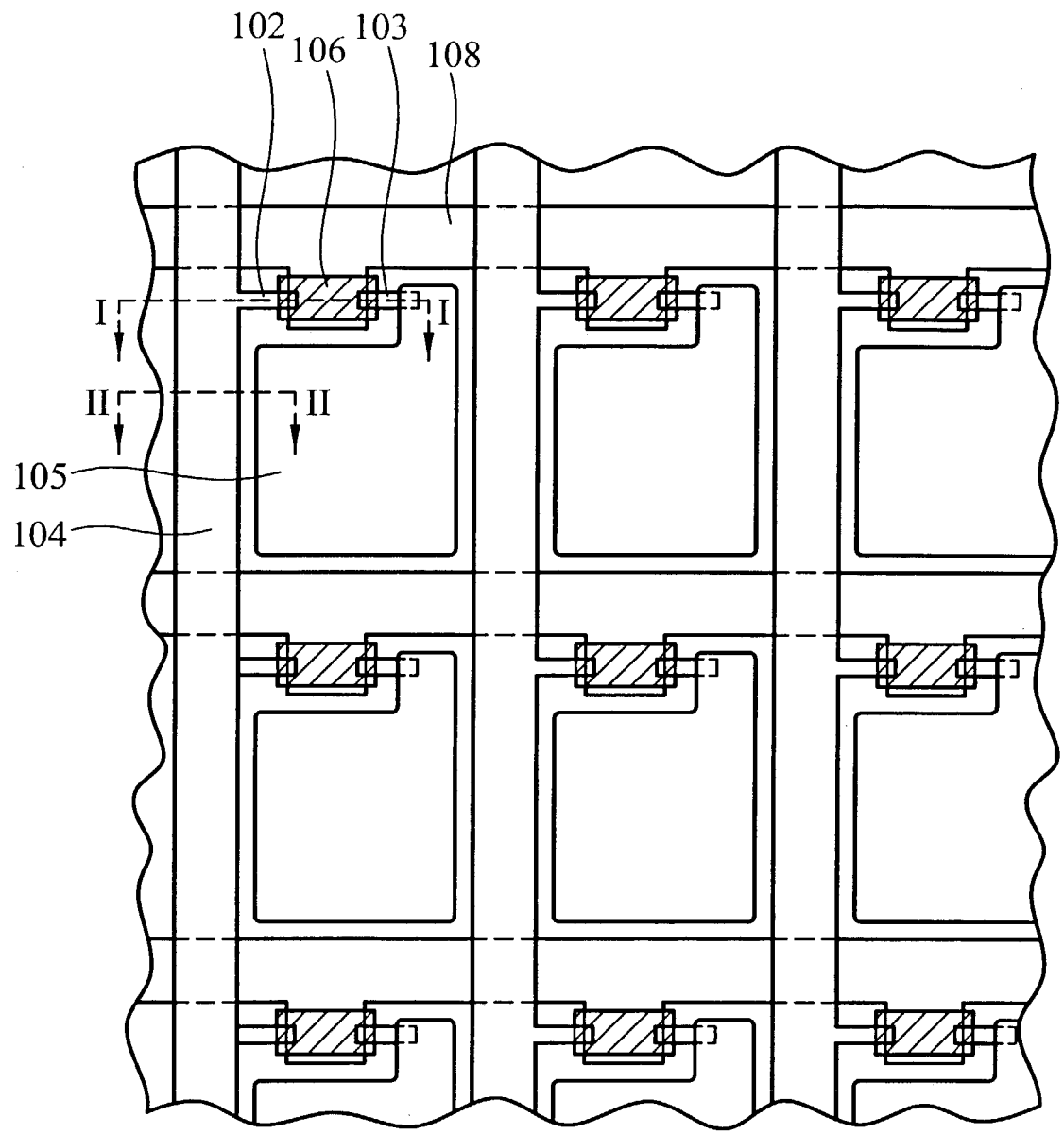
FIG. 1 is a top view showing a conventional TFT array substrate.
Figure 2:
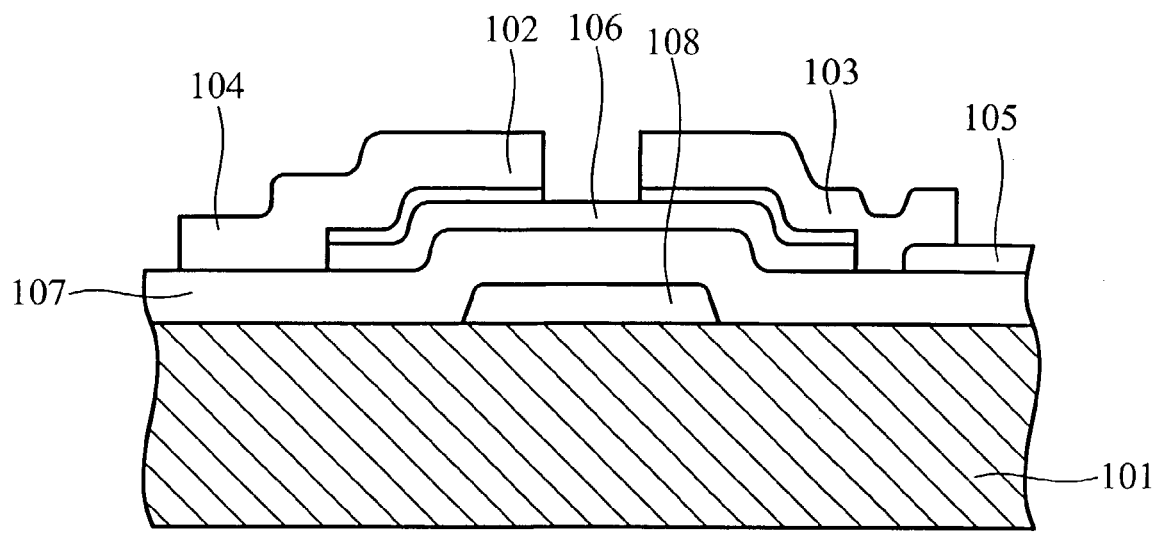
FIG. 2 is a cross-section taken at the line I—I in FIG. 1.
Figure 3:
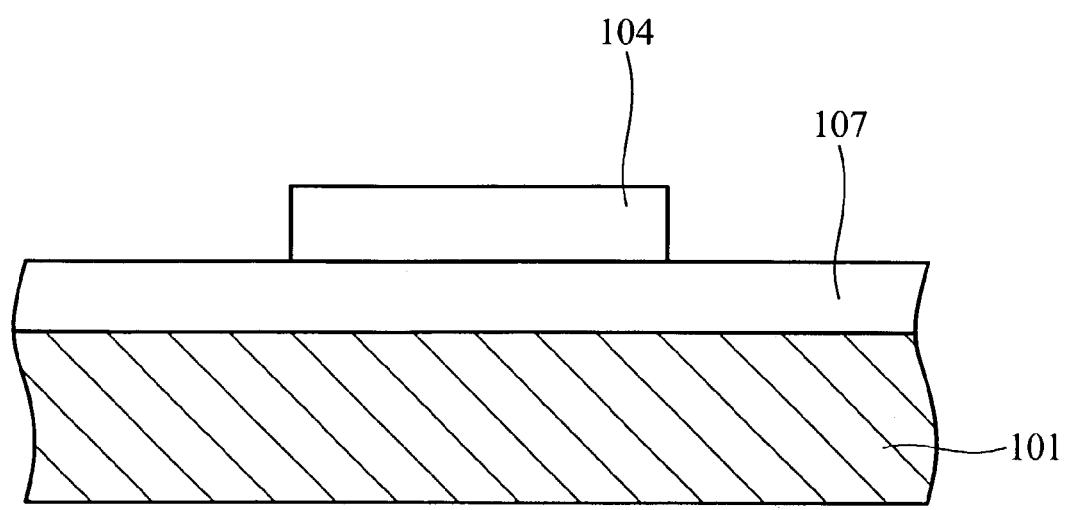
FIG. 3 is a cross-section taken at the line II—II in FIG. 1.
Figure 4:
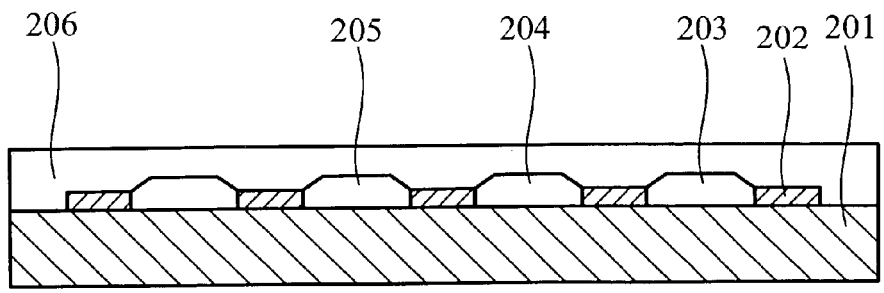
FIG. 4 illustrates the structure of the color filter substrate.
Figure 5:
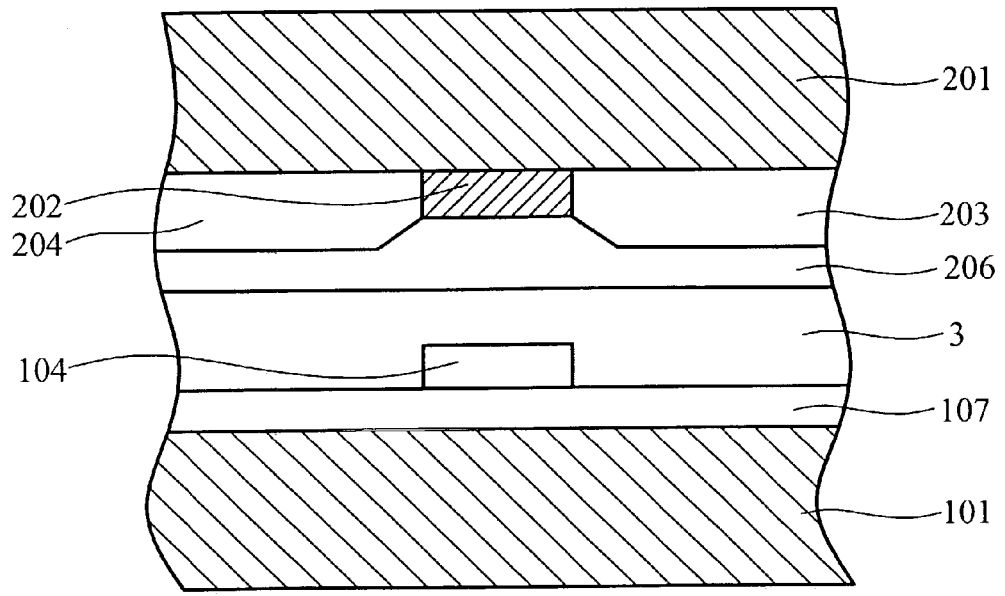
FIG. 5 is a cross-section of the TFT panel taken at the line II—II in FIG. 1.
Figure 6A:
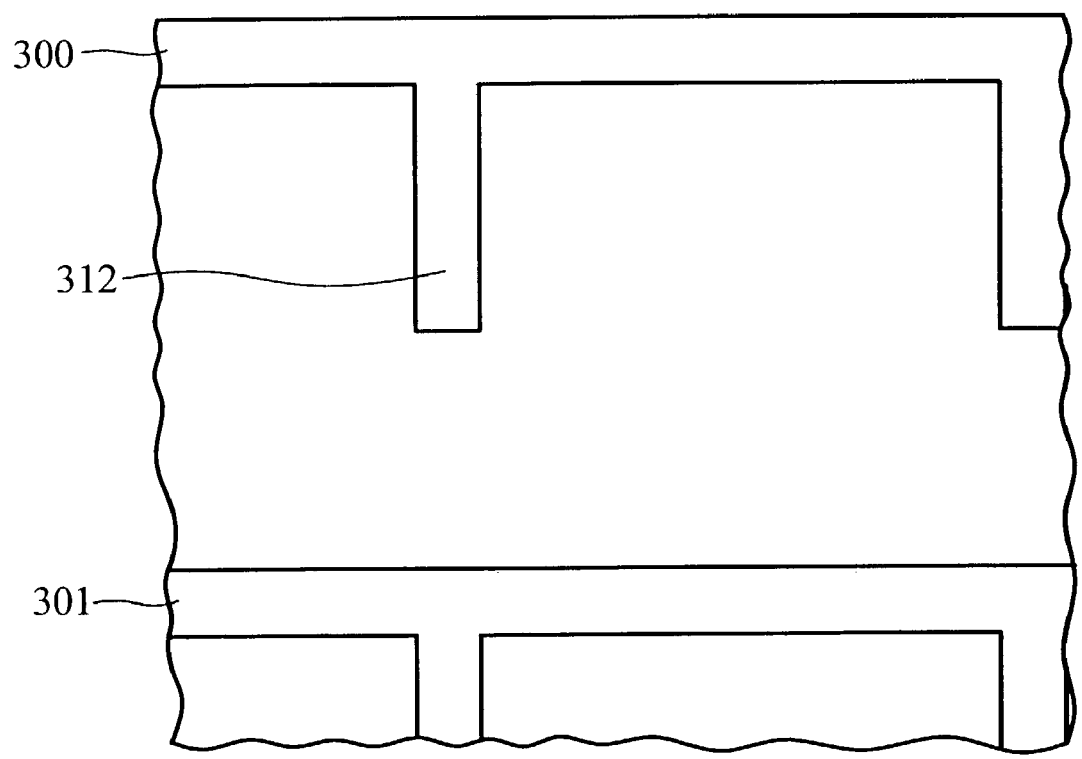
FIGS. 6A–6D show the manufacturing process of TFT array substrate of the invention.

First, as in FIG. 6A, a substrate 0 of, for example, glass, is provided. A deposition step is performed thereon, followed by a first photolithography step, to form parallel gate lines 300, 301 in a row direction on the substrate 0, wherein the gate line 300 has a protruding part, which is the gate electrode 312. Next, a gate insulating layer 305 (not shown) is formed on the gate lines 300, 301, gate electrode 312 and the substrate 0. The gate lines 300, 301 and gate electrode 312 are metal, formed by, for example, deposition. The gate insulating layer 305 is, for example, $SiO_2$, $SiN_x$, or silicon oxynitride, formed by deposition.

Figure 6B:
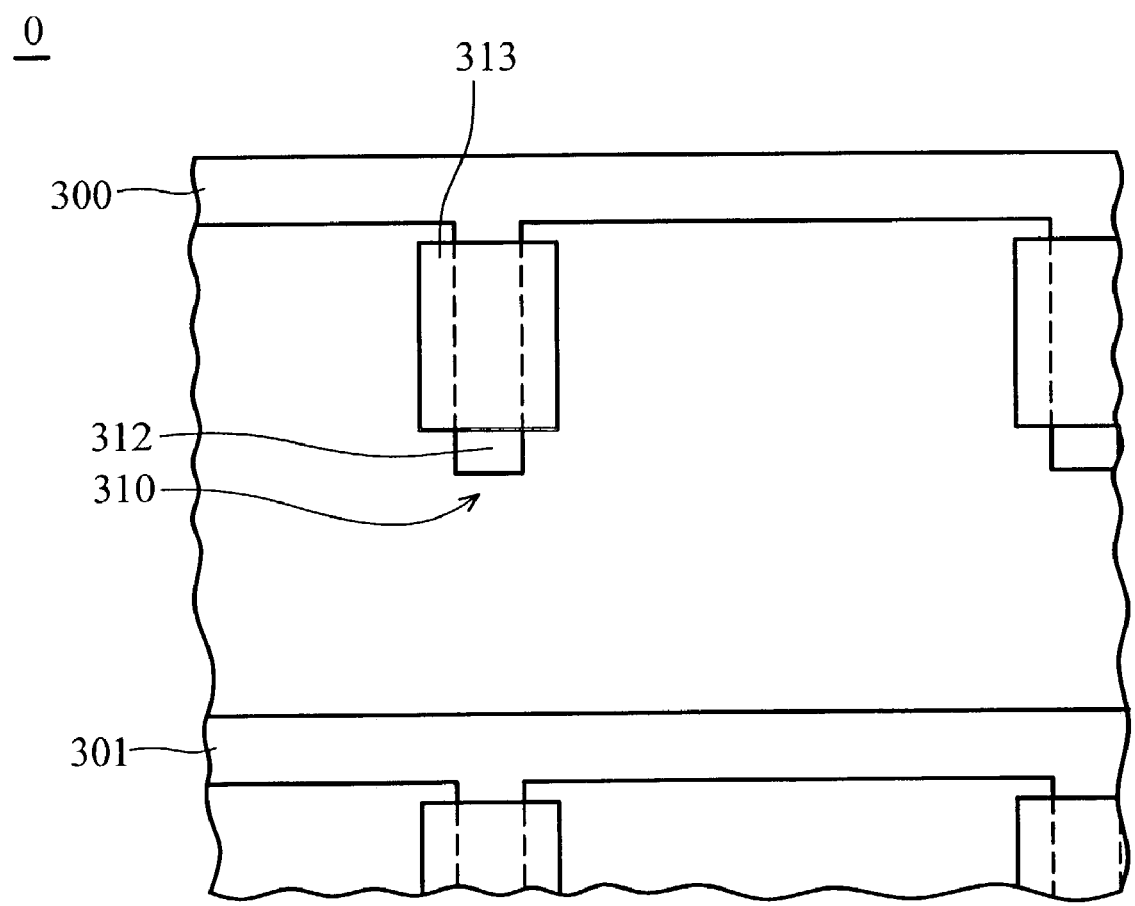

In FIG. 6B, a deposition step is performed on the substrate, followed by a second photolithography step, to form a α-Si layer (below a $n^+$ α-Si layer 313, not shown) and the $n^+$ α-Si layer 313 on part of the gate insulating layer 305, wherein the α-Si layer and $n^+$ α-Si layer 313 form a α-Si semiconductor island on a TFT area 310.

Figure 6C:
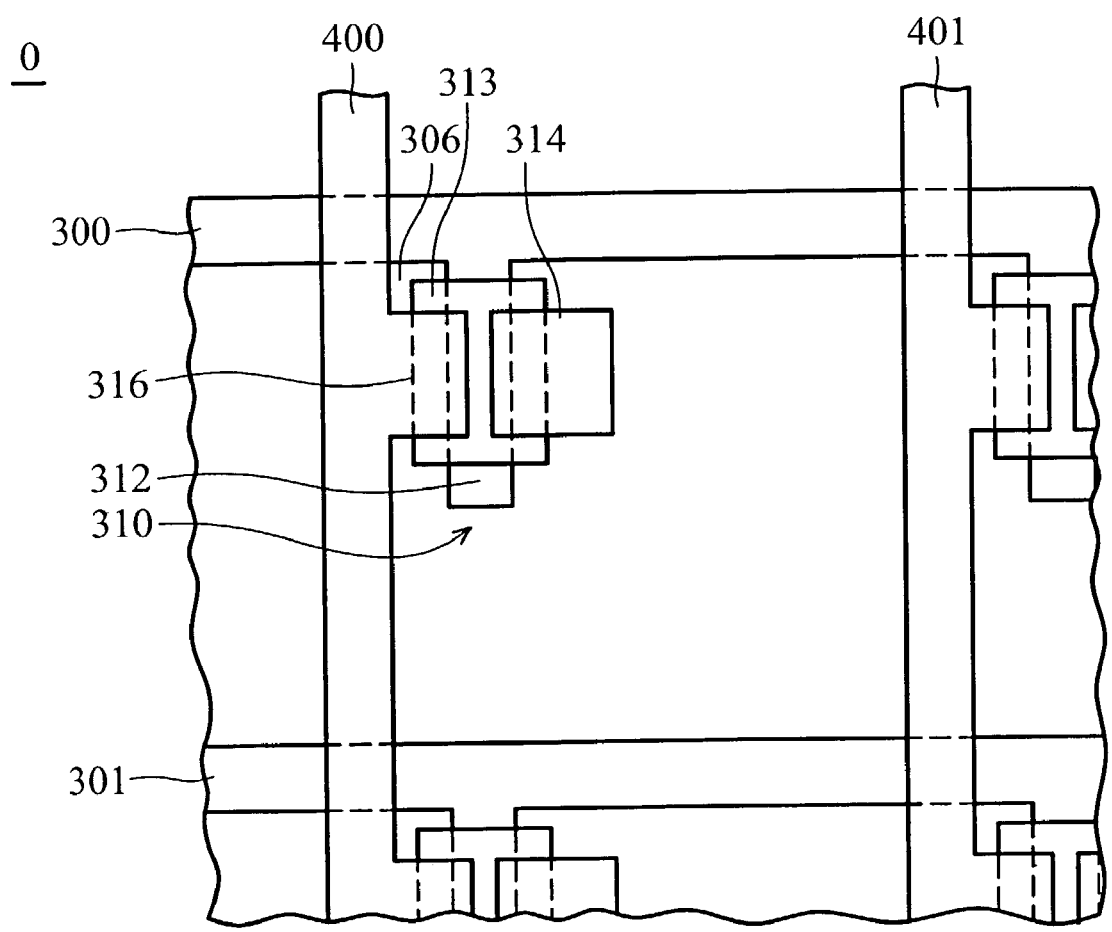

In FIG. 6C, a conductive layer (not shown) is deposited on the substrate, and a third photolithography step is then performed thereon to remove part of the conductive layer, such that parallel signal lines 400, 401 are formed in a columnar orientation on the gate insulating layer 305, and a source electrode 316 and a drain electrode 314 are formed on the $n^+$ α-Si layer 313. Then, etching is performed, utilizing the source electrode 316 and drain electrode 314 as a etching mask, to etch back part of the $n^+$ α-Si layer 313 to reveal part of the surface of the α-Si layer, such that a thin film transistor structure in the TFT area 310 is formed, wherein the source electrode 316 is electrically connected to the signal line 400.

Figure 6D:
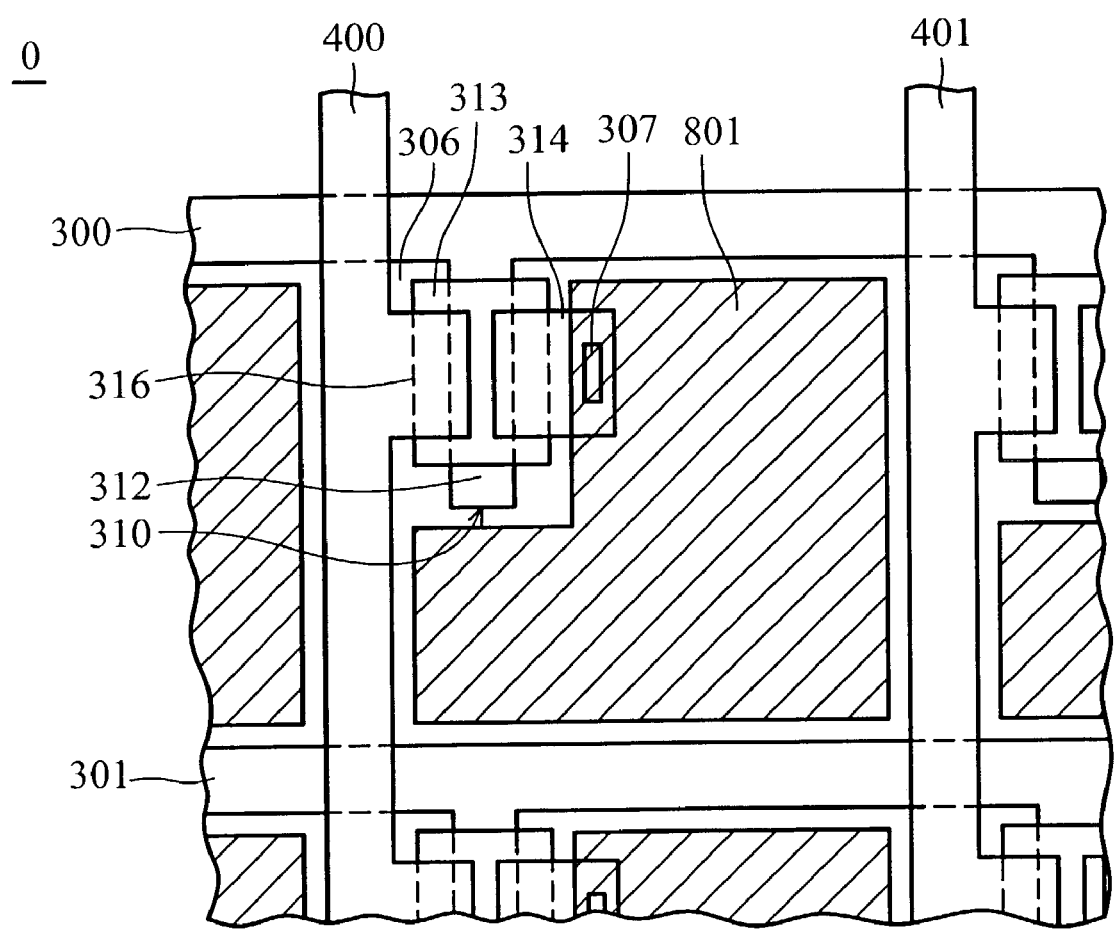

FIG. 6D is a top view of the TFT array substrate of the invention. After the thin film transistor in TFT area 310 is fabricated, a transparent photoresist (not shown) is formed conformally on the substrate 0, followed by a photolithography step whereby a contact hole 307 above the drain electrode 314 is formed to expose part of the surface of the drain electrode 314.

Finally, a pixel electrode 801 of high-transparency and low-resistance material, e.g. ITO, is formed on a pixel area 306 to drive the molecular orientation of liquid crystals, wherein the pixel electrode 801 is electrically connected to the drain electrode 304 via the contact hole 307.

Manufacture of Color Filter Substrate

Currently, numerous methods have been developed to fabricate color filters, including pigment dispersion, dyeing, electrodeposition, and printing. Of the invention, pigment dispersion is utilized to illustrate the manufacture of the color filter substrate.

FIGS. 7A–7K show the manufacturing process of color filter substrate of the invention.

Figure 7A:
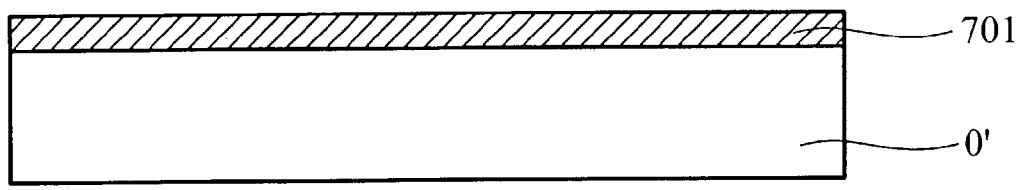
FIGS. 7A–7K show the manufacturing process of color filter substrate of the invention.

In FIG. 7A, a glass substrate 0' is provided with a light shielding layer 701 of, for example, Cr or black photo-sensitive resin formed thereon.

Figure 7B:
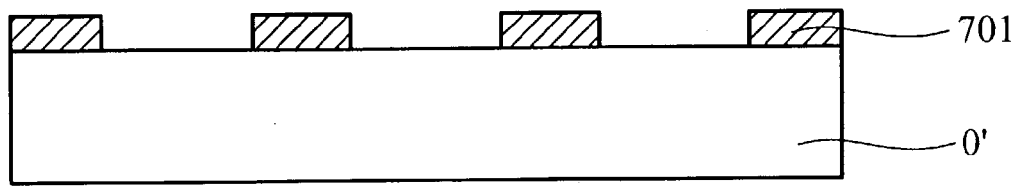

In FIG. 7B, the light shielding layer 701 is patterned by photolithography to be matrix-shaped, as it is called black matrix (BM), to shield light and separate color-filtering resins of different color to enhance color contrast.

Next, color-filtering units of red, green and blue are sequentially formed.

Figure 7C:
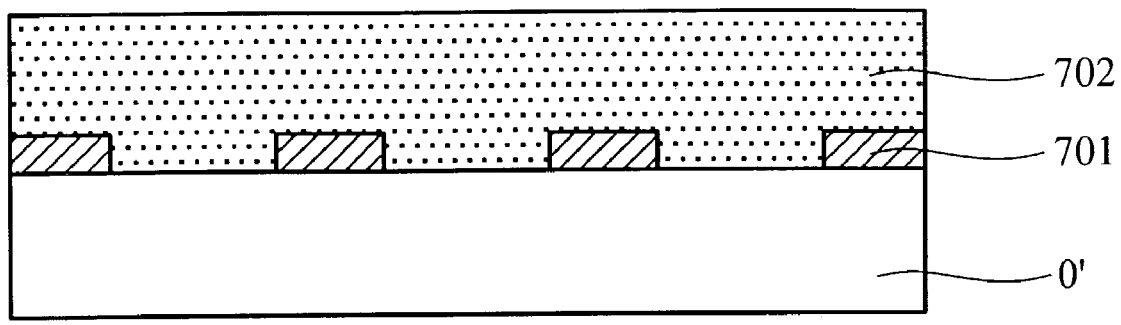
Figure 7D:
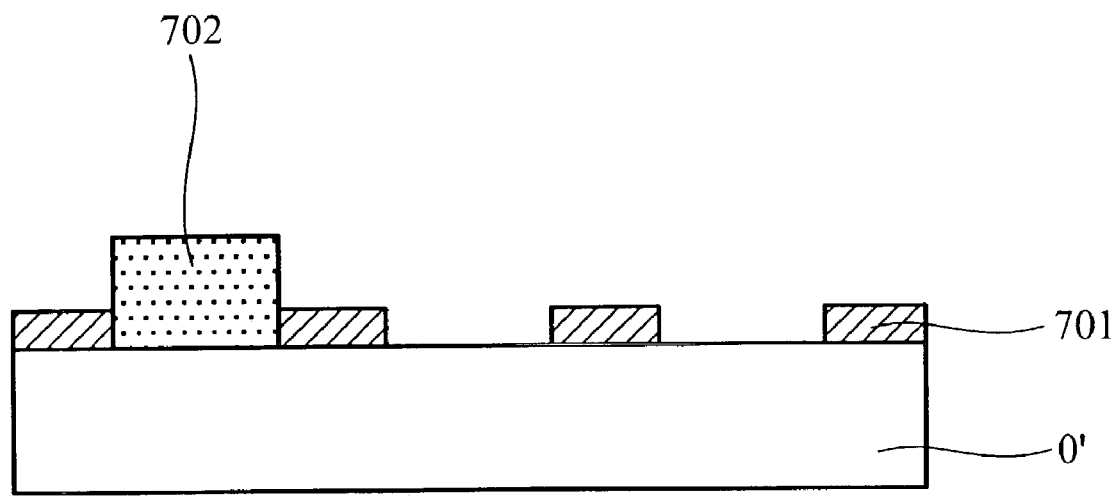

In FIG. 7C, a red resin is first spin-coated over the substrate 0' to form a red color-filtering layer 702. Then, as in FIG. 7D, photolithography is performed to leave only the red resin in the predetermined area.

Figure 7E:
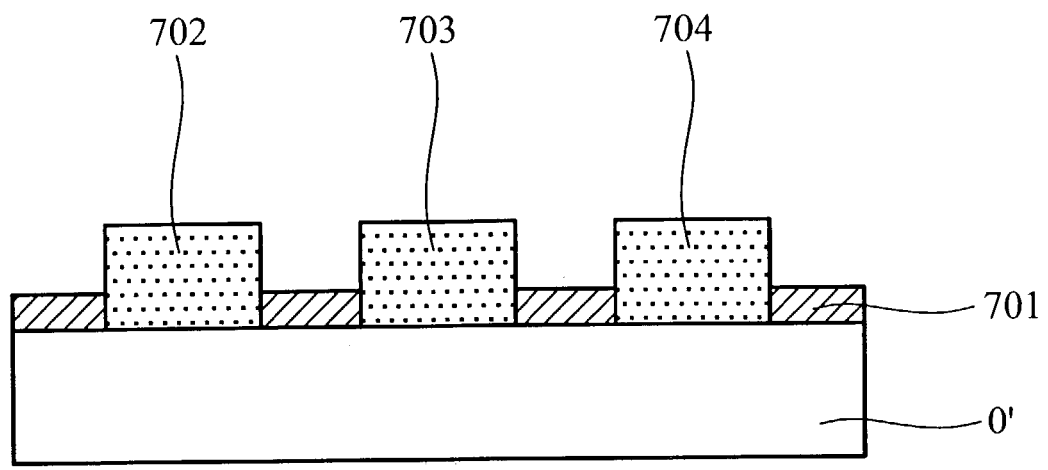

In FIG. 7E, in the same manner, a blue and a green resin are sequentially spin-coated over the substrate 0', and blue color-filtering units 703 and green color-filtering units 704 are left in the respective predetermined pixel areas.

Figure 7F:
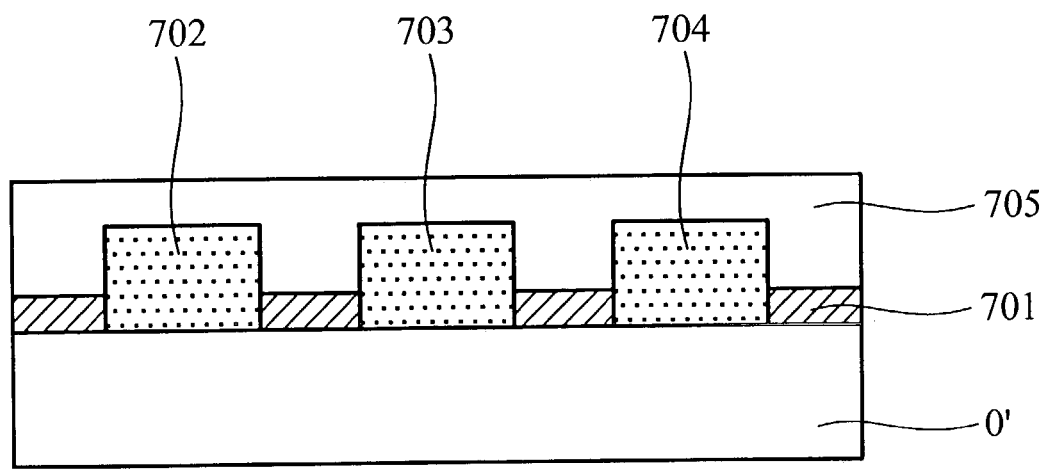
Figure 7G:
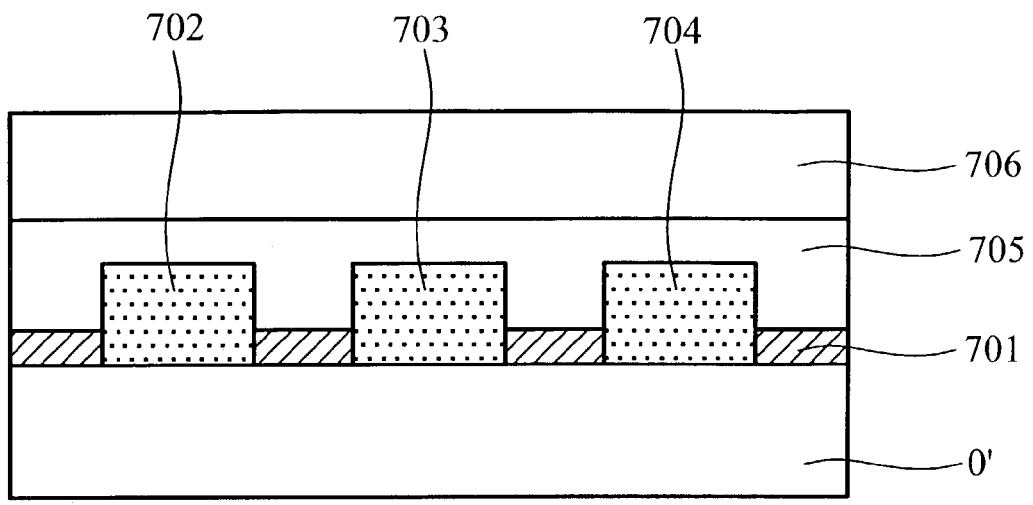
Figure 7H:
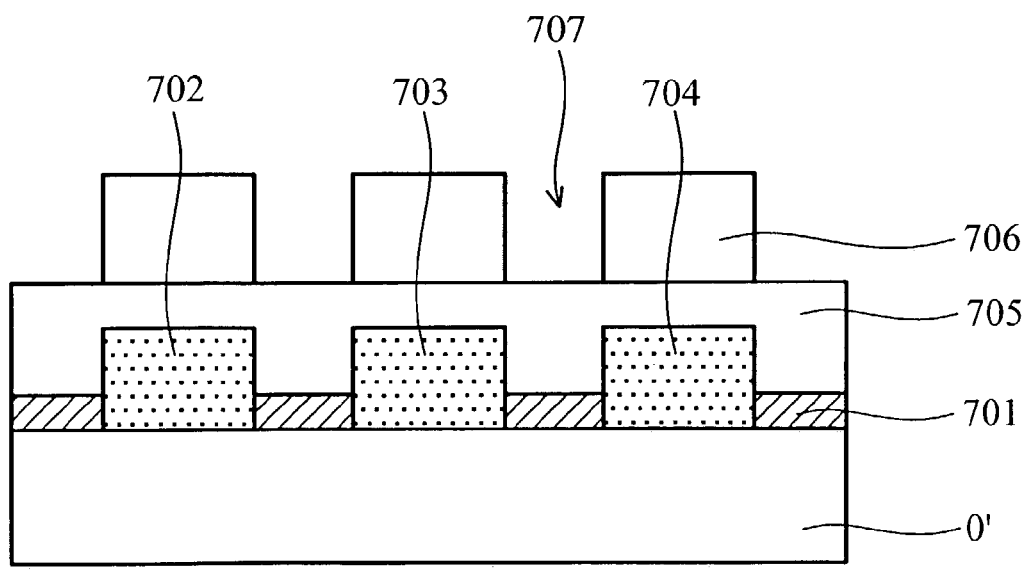
Figure 7I:
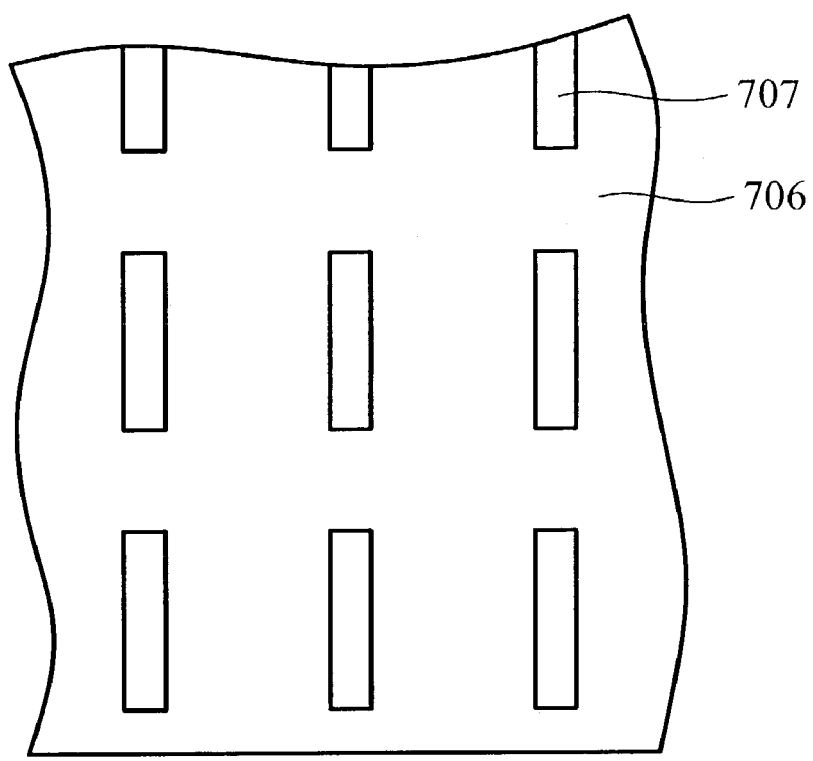
Figure 7J:
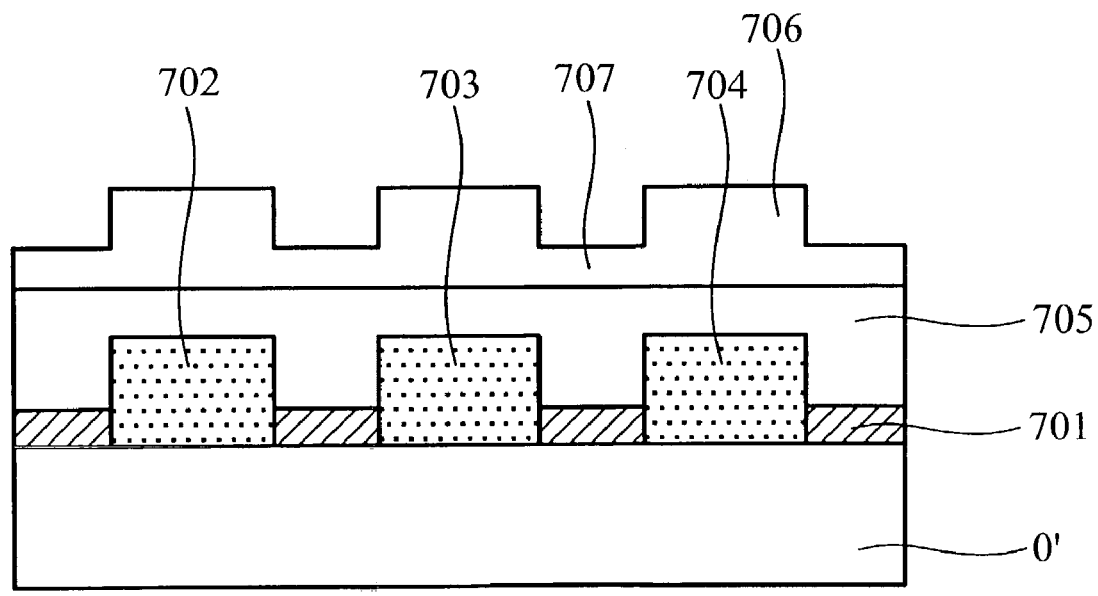

In FIG. 7F, a transparent planarization layer 705 is then formed on the substrate 0'. Then, as in FIG. 7G, a pixel electrode layer 706 of, for example, transparent conductive material, e.g. ITO or IZO, is formed on the planarization layer 705 to drive the molecular orientation of liquid crystals. Then, as a critical step of the present invention, a photoresist layer (not shown) is formed on the pixel electrode layer 706, followed by a photolithography step to form a patterned area 707 on the pixel electrode layer 706, as shown in FIG. 7H. FIG. 7I is a top view of the color filter substrate. The position of patterned area 707 corresponds to that of the signal lines 400, 401 on the TFT array substrate. The patterned area 707 is made up of a plurality of striped areas, segmented by the area corresponding to a part of the signal lines where the TFT areas 310 adjoin. By controlling the etching rate or time, the patterned area 707 can be thinned, as shown in FIG. 7J, or completely removed to be hollow, as shown in FIG. 7H.

Cell Process

Figure 7K:
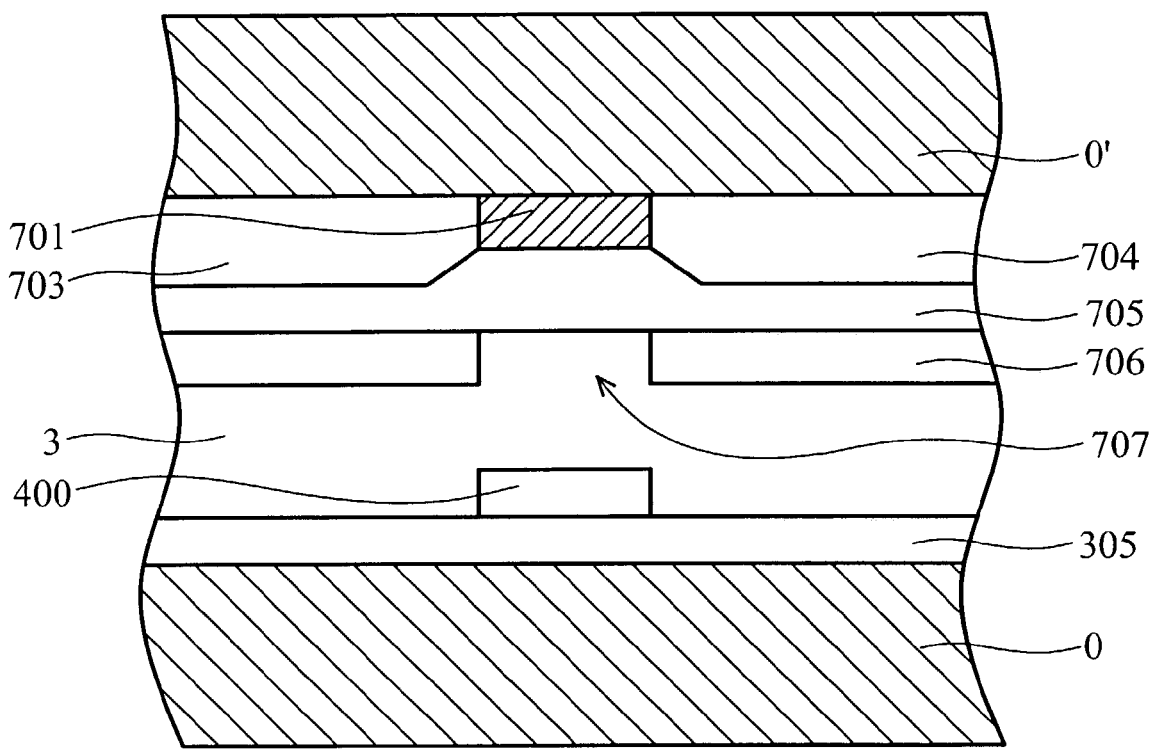

Next, as a normal fabricating process of LCD panel, the color filter substrate 0' and TFT array substrate 0 are aligned and combined, such that each pixel area 306 corresponds to a color filtering unit 702, 703, or 704, the striped patterned area 707 is superimposed onto the signal lines 400 and 401, and the part of pixel electrode layer 706, which segments the patterned area 707 into a plurality of striped areas, corresponding to the part of the signal lines where the TFT area 310 adjoins. FIG. 7K shows a cross-section of the LCD panel.

Afterward, liquid crystal is filled into the LCD panel, following the sealing of the panel.

According to the manufacturing process described above, the LCD panel provided includes, in the TFT array side, a substrate 0, parallel gate lines 300, 301 and parallel signal lines 400, 401, wherein the gate lines 300, 301 and signal lines 400, 401 are perpendicular, a pixel area 306 is enclosed by the adjacent gate lines 300, 301 and adjacent signal lines 400, 401, and a TFT area 310 is formed in the pixel area 306, having a source electrode 316 electrically connected to the signal line 400. In addition, a pixel electrode 801 is formed on the pixel area 306.

Moreover, the LCD panel includes, in the color filter side, a substrate 0', provided with a black matrix 701, color-filtering units 702, 703, 704, planarization layer 705, and a pixel electrode layer 706 with a patterned area 707. The patterned area 707 is made up of a plurality of striped areas, corresponding to the signal lines 400, 401 on the TFT array substrate. In addition, the area segments the patterned area 707 into striped areas corresponds to a part of the signal lines 400, 401 where the TFT area 310 adjoins.

According to the LCD and fabricating method thereof, capacitance loading of the signal lines is reduced by thinning the corresponding pixel electrode, thereby crosstalk resulting from coupling capacitance is reduced, and display quality is improved.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A liquid crystal display, comprising:
   a first substrate with a plurality of parallel gate lines and a plurality of parallel signal lines formed thereon, wherein the gate lines and signal lines are perpendicular, and a pixel area is defined by two adjacent gate lines and two adjacent signal lines;
   a source electrode and a drain electrode on the pixel area, wherein the source electrode is electrically connected to one of the two adjacent signal lines;
   a first pixel electrode formed on the pixel area, electrically connected to the drain electrode;
   a second substrate a predetermined distance above the first substrate, having a plurality of color-filtering areas, each formed directly above the respective pixel area on the first substrate; and
   a second pixel electrode layer on the second substrate, wherein the second pixel electrode layer includes a patterned area directly above the, wherein the patterned area is thinned relative to an area of the second pixel electrode layer that is not patterned signal lines.

2. The liquid crystal display as claimed in claim 1, wherein the second pixel layer is an indium tin oxide or indium zinc oxide layer.

3. The liquid crystal display as claimed in claim 1, wherein the first substrate or the second substrate is glass.

4. The liquid crystal display as claimed in claim 1, further comprising a liquid crystal layer filled between the first and second substrates.

5. The liquid crystal display as claimed in claim 1, further comprising a gate electrode, electrically connected to one of the two adjacent gate lines, to link the source electrode and the drain electrode.

6. A liquid crystal display, comprising
   a first substrate with a plurality of parallel gate lines and a plurality of parallel signal lines formed thereon, wherein the gate lines and signal lines are perpendicular, and a pixel area is defined by two adjacent gate lines and two adjacent signal lines;
   a source electrode and a drain electrode on the pixel area, wherein the source electrode is electrically connected to one of the two adjacent signal lines;
   a first pixel electrode formed on the pixel area, electrically connected to the drain electrode;
   a second substrate a predetermined distance above the first substrate, having a plurality of color-filtering areas, each formed directly above the respective pixel area on the first substrate; and
   a second pixel electrode layer on the second substrate comprising a plurality of striped areas segmented by areas corresponding to parts of the signal lines where the source electrodes adjoin.

7. The liquid crystal display as claimed in claim 6, wherein the second pixel layer is an indium tin oxide or indium zinc oxide layer.

8. The liquid crystal display as claimed in claim 6, wherein the first substrate or the second substrate is glass.

9. The liquid crystal display as claimed in claim 6, further comprising a liquid crystal layer filled between the first and second substrates.

10. The liquid crystal display as claimed in claim 6, further comprising a gate electrode, electrically connected to one of the two adjacent gate lines, to link the source electrode and the drain electrode.

11. A liquid crystal display, comprising
    a first substrate with a plurality of parallel gate lines and a plurality of parallel signal lines formed thereon, wherein the gate lines and signal lines are perpendicular, and a pixel area is defined by two adjacent gate lines and two adjacent signal lines;
    a source electrode and a drain electrode on the pixel area, wherein the source electrode is electrically connected to one of the two adjacent signal lines;
    a first pixel electrode formed on the pixel area, electrically connected to the drain electrode;

a second substrate a predetermined distance above the first substrate, having a plurality of color-filtering areas, each formed directly above the respective pixel area on the first substrate; and a second pixel electrode layer above and substantially covering the color-filtering areas, wherein the portions of the second pixel electrode layer directly above the signal lines are thinner than other portions thereof.

12. The liquid crystal display as claimed in claim 11, wherein the second pixel layer is an indium tin oxide or indium zinc oxide layer.

13. The liquid crystal display as claimed in claim 11, wherein the first substrate or the second substrate is glass.

14. The liquid crystal display as claimed in claim 11, further comprising a liquid crystal layer filled between the first and second substrates.

15. The liquid crystal display as claimed in claim 11, further comprising a gate electrode, electrically connected to one of the two adjacent gate lines, to link the source electrode and the drain electrode.

* * * * *